United States Patent
Schaller et al.

(10) Patent No.: US 6,948,311 B2
(45) Date of Patent: Sep. 27, 2005

(54) METHOD AND DEVICE FOR CONTROLLING AN EXHAUST GAS AFTERTREATMENT SYSTEM

(75) Inventors: Johannes Schaller, Leonberg (DE); Georg Weber, Brackenheim-Stockheim (DE); Horst Horndorf, Schwieberdingen (DE); Peter Khatchikian, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 10/416,373

(22) PCT Filed: Oct. 10, 2001

(86) PCT No.: PCT/DE01/03884

§ 371 (c)(1),
(2), (4) Date: Nov. 26, 2003

(87) PCT Pub. No.: WO02/38932

PCT Pub. Date: May 16, 2002

(65) Prior Publication Data

US 2004/0074225 A1 Apr. 22, 2004

(30) Foreign Application Priority Data

Nov. 11, 2000 (DE) .................................. 100 56 016

(51) Int. Cl.⁷ ............................................... F01N 3/00
(52) U.S. Cl. ............................. 60/286; 60/274; 60/285; 60/295; 60/297; 60/303
(58) Field of Search ......................... 60/274, 285, 286, 60/295, 284, 297, 303

(56) References Cited

U.S. PATENT DOCUMENTS

| 4,685,290 | A | | 8/1987 | Kamiya et al. | |
|---|---|---|---|---|---|
| 5,522,218 | A | * | 6/1996 | Lane et al. | 60/274 |
| 5,842,341 | A | * | 12/1998 | Kibe | 60/274 |
| 5,996,337 | A | * | 12/1999 | Blosser et al. | 60/274 |
| 6,119,448 | A | * | 9/2000 | Emmerling et al. | 60/274 |
| 6,415,602 | B1 | * | 7/2002 | Patchett et al. | 60/286 |

FOREIGN PATENT DOCUMENTS

| DE | 197 46 855 | 4/1999 |
|---|---|---|
| DE | 199 06 287 | 8/2000 |
| EP | 11 30 227 | 9/2001 |
| FR | 27 74 421 | 8/1999 |

* cited by examiner

*Primary Examiner*—Binh Q. Tran
(74) *Attorney, Agent, or Firm*—Kenyon & Kenyon

(57) ABSTRACT

A method and a device are described for controlling an exhaust gas aftertreatment system for an internal combustion engine. A state variable is ascertained, which characterizes the state of the exhaust gas aftertreatment system. The temperature of the exhaust gas aftertreatment system is controlled as a function of the state of the exhaust gas aftertreatment system and/or of the internal combustion engine.

7 Claims, 3 Drawing Sheets

METHOD AND DEVICE FOR CONTROLLING AN EXHAUST GAS AFTERTREATMENT SYSTEM

FIELD OF THE INVENTION

The present invention relates to a method and a device for controlling an exhaust gas aftertreatment system, in particular in a motor vehicle.

BACKGROUND INFORMATION

A conventional method and a device for controlling an exhaust gas aftertreatment system of an internal combustion engine have been described, for example, in German Patent No. 199 06 287. In that reference, the exhaust gas aftertreatment system includes at least one particulate filter, which is used particularly in direct-injection internal combustion engines. In the method described, a state variable is recorded, which characterizes the state of the exhaust gas aftertreatment system, such as the loading state of the particulate filter. If this state variable, i.e. the loading of the particulate filter, exceeds certain values, the device initiates a special operating state in which the particle filter is regenerated by suitable measures. It is also provided that fuel reaches the exhaust gas tract, which is oxidized in an oxidizing catalytic converter, in order to raise the exhaust gas temperature.

For the initiation and/or for carrying out the regeneration of the particulate filter, additional fuel is required, which is either metered in using an additional metering device in the exhaust gas tract, or with the aid of the usual control elements for fuel injection. The disadvantage here is that the regeneration increases the fuel consumption. Moreover, it is possible that, because of the regeneration, the exhaust gas temperature in the particulate filter increases to impermissibly high values.

SUMMARY OF THE INVENTION

Because the temperature in the exhaust gas aftertreatment system, especially in the particulate filter, is controlled or regulated by a value as a function of the state of the exhaust gas aftertreatment system and of the state of the internal combustion engine, the increased fuel consumption in the special operating state may be clearly reduced. Furthermore, the temperatures required for the special operating state may safely be maintained. Temperature deviations to small or large values do not occur.

For this purpose, a control of the temperature of the exhaust gas aftertreatment system is carried out, especially of the temperature of the particulate filter, as a function of the state of the exhaust gas aftertreatment system and of the internal combustion engine. In this context, in one embodiment, no feedback of the actual temperature upstream of the particulate filter takes place, but rather the temperature upstream of the particulate filter is ascertained using other criteria, and on this basis it is determined whether the regeneration is to be ended. In particular, the temperature upstream of the oxidizing catalytic converter, which corresponds to the exhaust gas temperature of the internal combustion engine, is taken into consideration. This quantity may be both measured, and determined, from other operating variables, such as the load and the rotational speed.

One specific embodiment is especially advantageous in which the control system is configured in such a way that the temperature is measured upstream of the particulate filter and compared to the setpoint value, and, starting from this comparison, the additional fuel quantity is determined.

It is advantageous if the special operating state is divided into at least two phases. In a first phase, the amount of uncombusted fuel in the exhaust gas may be increased over the course of time. In a second phase, the amount of uncombusted fuel in the exhaust gas takes on a constant value upstream of the oxidizing catalytic converter.

By this procedure it may be achieved that the temperature rises according to a desired function, that is, neither too fast nor too slowly. The temperature may thus assume a constant value, or the control variables are adjusted in such a way that the temperature remains constant upstream of the particulate filter even at a variable operating state of the internal combustion engine. At an increase that is too slow, the special operating state lasts too long. At too rapid an increase, the particulate filter may be damaged, and uncombusted fuel may reach the environment, Because the duration of the first and/or second phase is predefined, the additional amount of fuel may be adjusted to the current operating state.

Because the second phase ends when regeneration begins, the regeneration may be speeded up, and, in addition, the consumption of fuel may be further minimized.

One further refinement is particularly advantageous in which, in a third phase, the amount of uncombusted fuel is set intermittently to the constant value, such as to the value of the second phase.

DETAILED DESCRIPTION

Figure 1:
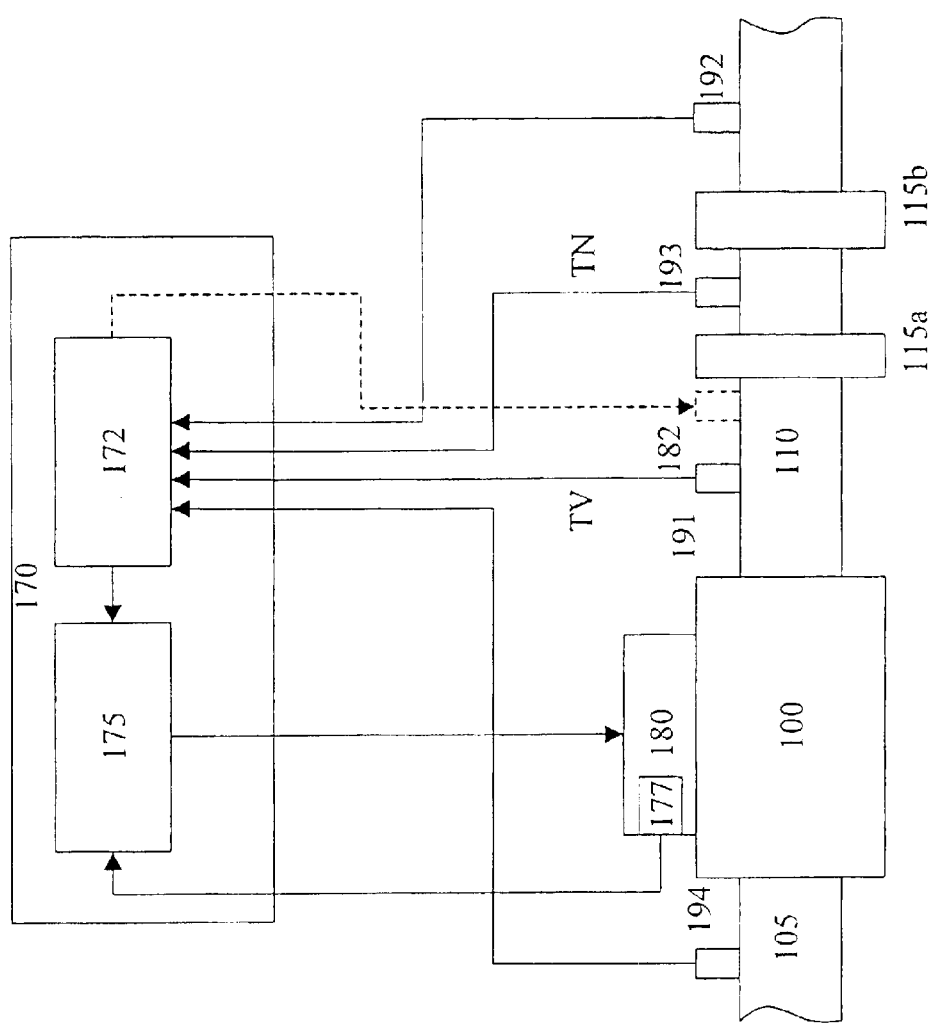
FIG. 1 shows a block diagram of the device according to an embodiment of the present invention.

FIG. 1 shows elements of an exhaust gas aftertreatment system of an internal combustion engine according to an embodiment of the present invention. The internal combustion engine is denoted by 100. It is supplied with fresh air through a fresh-air pipe 105. The exhaust gases of internal combustion engine 100 exit into the environment through an exhaust pipe 110. An exhaust gas aftertreatment system 115 is situated in the exhaust gas line which, in the specific embodiment illustrated, includes a catalytic converter 115a and a particulate filter 115b. Moreover, it is possible to provide several catalytic converters for different pollutants, or combinations of at least one catalytic converter and one particulate filter.

Also provided is a control unit 170 which includes at least one engine control unit 175 and an exhaust gas aftertreatment control unit 172. Engine control unit 175 applies control signals to a fuel metering system 180. Exhaust gas aftertreatment control unit 172 applies control signals to engine control unit 175 and, in one embodiment, to a control element 182 which is arranged in the exhaust pipe upstream of the exhaust-gas treatment system or in the exhaust-gas treatment system itself.

Moreover, various sensors are provided which feed signals to the exhaust gas aftertreatment control unit and to the engine control unit. Thus, provision is made for at least one first sensor 194 which delivers signals characterizing the state of the air which is fed to the internal combustion engine. A second sensor 177 delivers signals characterizing the state of fuel metering system 180. At least one third sensor 191 delivers signals characterizing the state of the exhaust gas upstream of the exhaust gas aftertreatment system. At least one fourth sensor 193 delivers signals characterizing the state of exhaust gas aftertreatment system 115. Moreover, at least one sensor 192 delivers signals characterizing the state of the exhaust gases downstream of the exhaust gas aftertreatment system. These sensors may measure temperature values and/or pressure values. Moreover, sensors may also be used which detect the chemical composition of the exhaust gas and/or of the fresh air. They may include, for example, lambda sensors, NOX sensors or HC sensors.

The output signals of first sensor 194, of third sensor 191, of fourth sensor 193 and of fifth sensor 192 may be applied to exhaust gas aftertreatment control unit 172. The output signals of second sensor 177 may be applied to engine control unit 175. It is also possible to provide further sensors (not shown) which detect a signal with respect to the driver's command, further ambient conditions, or engine operating states.

The engine control unit and the exhaust gas aftertreatment control unit may form one structural unit. However, they may also be implemented as two spatially separated control units.

In the following, the procedure of the present invention is described using as an example a particulate filter which is used particularly for direct-injection internal combustion engines. However, the procedure according to the invention is not limited to this use; it may also be used for other internal combustion engines having an exhaust gas aftertreatment system. It can be used, in particular, in the case of exhaust gas aftertreatment systems featuring a combination of a catalytic converter and a particulate filter. Furthermore, it may be used in systems which are furnished with only one or more catalytic converters and/or one or more storage elements for gaseous exhaust gas components.

Based on the existing sensor signals, engine control 175 calculates the control signals for sending to fuel metering system 180. This then meters in the appropriate fuel quantity to internal combustion engine 100. During combustion, particulates can develop in the exhaust gas. They are trapped by the particulate filter in exhaust gas aftertreatment system 115. In the course of operation, corresponding amounts of particulates accumulate in particulate filter 115. This impairs the functioning of the particulate filter and/or of the internal combustion engine. Therefore, provision is made for a regeneration process to be initiated at certain intervals or when the particulate filter has reached a certain loading condition. This regeneration is referred to herein as a "special operation".

The loading state is detected, for example, on the basis of various sensor signals. Thus, first of all, it is possible to evaluate the differential pressure between the input and the output of particulate filter 115. Secondly, it is possible to ascertain the loading state on the basis of different temperature and/or different pressure values. In addition, it is possible to utilize further variables to calculate or simulate the loading condition. A suitable procedure is known, for example, from German Patent No. 199 06 287.

When the exhaust gas aftertreatment control unit detects the particulate filter to have reached a certain loading state, then the regeneration is initialized. Various possibilities are available for regenerating the particulate filter. Thus, first of all, provision may be made for certain substances to be fed to the exhaust gas via control element 182, which then cause a corresponding reaction in exhaust gas aftertreatment system 115. These additionally metered substances cause, inter alia, an increase in temperature and/or an oxidation of the particulates in the particulate filter. Thus, for example, provision can be made for fuel and/or an oxidizing agent to be supplied via control element 182.

In one embodiment, provision can be made that a corresponding signal be transmitted to engine control unit 175 and that the engine control unit carries out a so-called postinjection, such as a late postinjection. The postinjection makes it possible to selectively introduce hydrocarbons into the exhaust gas which contribute to the regeneration of the exhaust gas aftertreatment system 115 via an increase in temperature.

Usually, provision is made to determine the loading state on the basis of different variables. By comparison to a threshold value, the different conditions are detected and the regeneration is initiated as a function of the detected loading state.

In the specific embodiment shown, exhaust gas aftertreatment system 115 includes an oxidizing catalytic converter 115*a* as well as a post-connected particulate filter 115*b*. The temperature (TV) upstream of the catalytic converter may be recorded using sensor 191. Temperature (TN) downstream of the catalytic converter, which corresponds to the temperature upstream of the particulate filter, is recorded using sensor 193. In addition, a sensor 192 is provided which ascertains the differential pressure between the input and the output of particulate filter 115*b*. Furthermore, a device 182 is provided which introduces fuel into the exhaust gas tract, especially into exhaust gas pipe 110 upstream of the oxidizing catalytic converter. As an alternative, it may also be provided that fuel gets to the exhaust gas tract via the combustion chamber by suitable control of control element 180. It is important that uncombusted fuel should reach the oxidizing catalytic converter. In this context, incompletely combusted fuel, which can be converted in the oxidizing catalytic converter, is also considered uncombusted fuel.

The various variables with respect to the temperature and the pressure difference may be recorded using the sensors shown, or calculated and/or simulated by control unit 170, starting from other measured values and/or control signals which are present in control unit 170.

The fuel quantity introduced into the exhaust gas tract reacts in the oxidizing catalytic converter and may be burned there in a flame-free combustion. This leads to an increase in temperature downstream of oxidizing catalytic converter 115*a*. According to the present invention, a fuel quantity is metered in such a way that the temperature increases to a value that is required for the regeneration of the particulate filter. The regeneration of the particulate filter takes place at temperatures above a certain value, which typically lies in the range of 300° C. and 650° C., depending to an extent on the particular design of the exhaust gas aftertreatment system and the nature of the particulate layer in the filter.

At exhaust gas temperatures that are too high, the particulate filter may be damaged by overheating. This is a particular problem if a large quantity of particulates in the filter is converted, leading to an additional temperature increase. If, on the other hand, the exhaust gas temperature is too low and/or the gas volume flow in the exhaust gas is too high, a part of the fuel is reacted in the oxidizing catalytic converter and the rest gets out uncombusted into the environment.

The procedural method according to the present invention is described below with the aid of the flow diagram of FIG.

2. In a first step 200, the loading state of the particulate filter is determined, i.e. a state variable P, which characterizes the state of the exhaust gas aftertreatment system is ascertained. This state variable characterizes the soot mass that has collected in particulate filter 115*b*. The determination of state variable P can be carried out in different ways. For example, it may be provided that the state variable be simulated, starting from various operating parameters of the internal combustion engine. Thus, for example, the state variable may be integrated over time, starting from the fuel quantity injected, the rotational speed and further variables. For this purpose, the generated soot mass is read out from a characteristics map for each operating point, and is summed up. In another specific embodiment, the pressure loss over the particulate filter is measured. For this purpose, a differential pressure sensor is employed which yields a pressure quantity that corresponds to the pressure difference between the input and the output of the particulate filter.

Subsequent interrogation 210 checks whether this state variable P is greater than a threshold value PSW. A regeneration of the particulate filter is necessary in this case. If this is not the case, then step 200 follows again.

If a regeneration is necessary, there follows interrogation 210. Interrogation 210 checks whether an operating point is at hand which is favorable for a regeneration. Favorable operating points are operating points where the exhaust gas temperature does not take on values that are too low, and the gas flow does not take on values that are too high. Such operating points may occur when the injected fuel quantity takes on high values, and thus, in the simplest specific embodiment it is checked whether fuel quantity QK, which is injected, is greater than a threshold value QKSW. It may further be provided to check whether the quotient of the injected fuel quantity QK and the gas flow is greater than a threshold value. If this is not the case, then step 200 is repeated.

If the operating point is favorable, step 230 is carried out, in which the regeneration is initiated. Alternative to interrogations 210 and 220, other procedures may also be used to decide whether a regeneration is to be carried out. It may especially be provided that the two interrogations 210 and 220 may be exchanged in their time sequence. It may additionally be provided that further interrogations are provided, so that, for example, in the case of a partial loading, a regeneration is carried out only when the operating point is favorable. If the state variable reaches a value which lies substantially above the threshold value for the state variable, initiation of regeneration takes place, independent of the operating point.

In step 230, temperature TV upstream of the oxidizing catalytic converter is ascertained. For this purpose, temperature TV is stored in a characteristics map, as a function of various operating parameters of the internal combustion engine. It is especially advantageous if, in this case, rotational speed N and the engine load are taken into consideration. As the load quantity, the fuel quantity to be injected is used. It is particularly advantageous if this quantity, read out from the characteristics map, is corrected for the compensation of the influences of outside temperature and travel wind cooling, using correction factors. In this context, the correction factors are specified as a function of the outside temperature and/or the travel speed of the vehicle. It is of advantage that all these variables are available in control unit 175, and thus no additional sensors are required.

In subsequent step 240, the dosing pattern is fixed. The dosing pattern is defined by the variation with time of the additionally metered-in fuel quantity QZ. It may be provided that, during dosing, at least two phases are provided. In a first phase, additional quantity QZ rises from the value 0 to a constant value QKZ. It may be provided that the increase follows a parabola. Alternatively, it may also be provided that a linear increase be provided. Constant value QKZ, to which the additional fuel quantity is increased, may be determined starting from temperature TV upstream of the catalytic converter, rotational speed N and the load of the internal combustion engine. Thus, in relation to these magnitudes, i.e. the temperature upstream of the catalytic converter, the desired temperature downstream of the catalytic converter and further operating characteristic values such as the rotational speed and the load, additional fuel quantity QZ is determined. This determination may take place with the aid of a characteristics map. It is advantageous if the initial increase of the increase, and thus the duration of the increase, may be predefined as a function of the temperature upstream of the catalytic converter.

In a further embodiment of the present invention, the dosing quantity after expiration of the first phase is set so that the exhaust gas temperature upstream of the particulate filter remains constant even if the operating state of the internal combustion engine changes.

In step 250, the additional fuel quantity is then metered in with the predefined dosing pattern. Additional fuel quantity QZ, on the one hand, may be supplied directly to the exhaust gas tract, and alternatively it may also be provided that the fuel quantity be metered in with the aid of the control element used for the fuel metering.

In step 260, temperature TV upstream of the catalytic converter is ascertained continuously. Here, a characteristics map or a sensor are may also be used. If the temperature changes upstream of the catalytic converter, the additional fuel quantity QZ to be injected is appropriately recalculated and corrected.

Subsequent interrogation 270 checks whether the retention time has expired, i.e., the interrogation checks whether additional fuel is being supplied sufficiently long. For the implementation of this interrogation, several specific embodiments are available.

In a first simple implementation, it is provided that the regeneration be ended after a specified time. In this context, a fixed specified duration or a duration may be selected which is specified as a function of the operating state of the internal combustion engine. Thus, in addition, in step 240 a time counter is set to 0, and in interrogation 270 it is checked whether the time counter has exceed a specified value.

In a further embodiment, it is provided that the metering in of the additional fuel be ended or interrupted when the regeneration of the particulate filter has begun. For this, the regeneration initiation is detected in the particulate filter. This may be done, for example, by evaluating temperature TN upstream of the particulate filter and the temperature downstream of the particulate filter. If the temperature downstream of the particulate filter is greater than the temperature upstream of the particulate filter, one may assume an incipient regeneration, since this leads to a temperature increase. If the temperature downstream of the filter runs through a maximum shortly after the beginning of the retention time, soot burning has set in. Therefore, according to the present invention, it is checked whether the temperature downstream of the filter is greater than upstream of the filter, and, depending on this interrogation, it is decided that the retention time has expired. For the evaluation of the temperature, a correction may be provided which takes into consideration the heat release of the particulate filter to the surroundings, especially the heat radiation.

Instead of the temperature sensor, other sensors may also be used, such as a differential pressure sensor, which measures the pressure difference upstream and downstream of the particulate filter, or a sensor which records the exhaust gas composition upstream and downstream of the particulate filter. For this, a so-called lambda sensor is particularly suitable, which records the oxygen concentration in the exhaust gas. If the oxygen concentration downstream of the particulate filter is less than that upstream of the particulate filter, a beginning regeneration is determined to be taking place.

A disadvantage of this procedure is that, during the metering in of fuel, the conversion of NO, generated by the engine, to $NO_2$ is suppressed. When the metering in of additional fuel is eliminated or interrupted, $NO_2$ is formed again in the oxidizing catalytic converter, which reacts with the particles in the particulate filter and leads to an additional particle breakdown.

It is advantageous if, after shutting off the additional fuel metering, it is periodically switched on and off again. By doing this, a decrease in the temperature during regeneration may be prevented.

Figure 2:
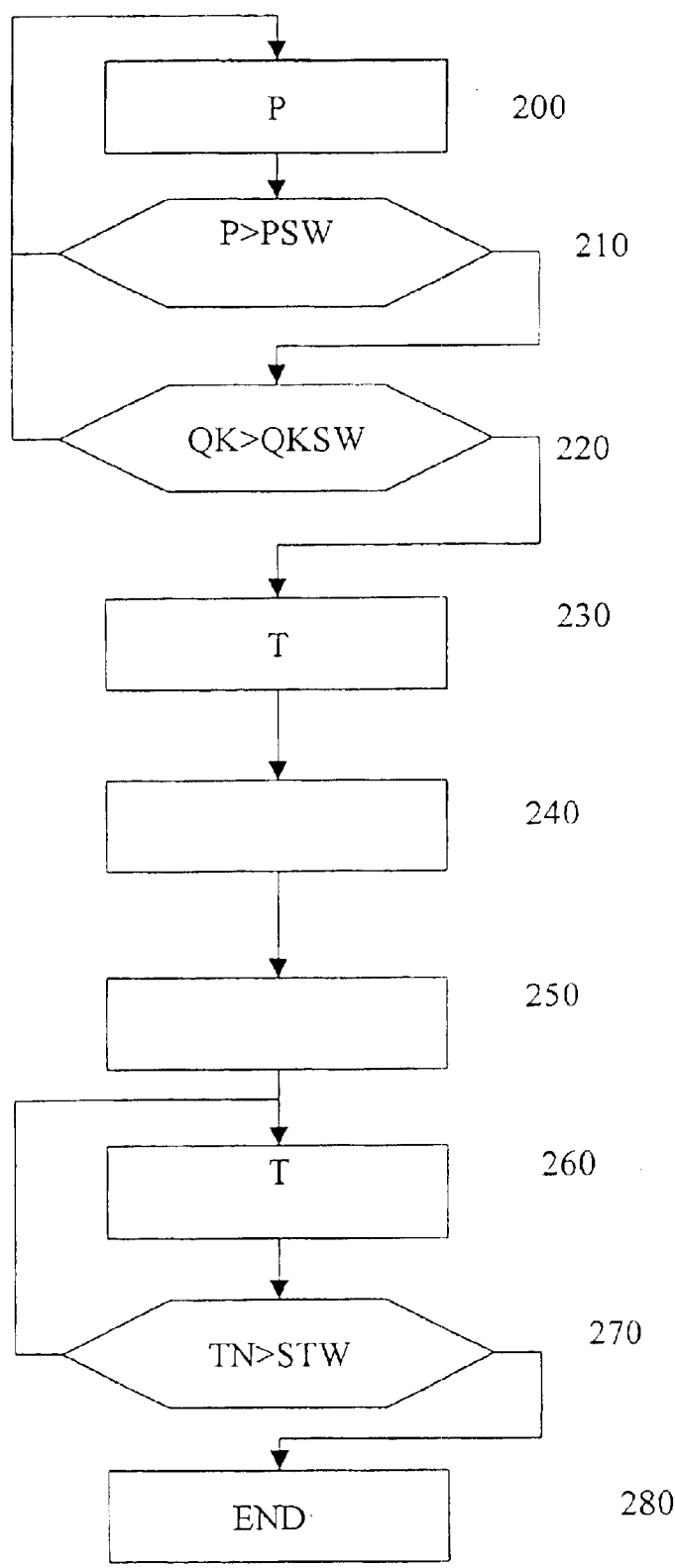
FIG. 2 shows a flow chart of the method according to an embodiment of the present invention.

In the specific embodiment as shown in FIG. 2, a control of the temperature of the exhaust gas aftertreatment system and of the particulate filter is carried out as a function of the state of the exhaust gas aftertreatment system, of the internal combustion engine, and of the particulate layer. In this context, no feedback of the actual temperature takes place upstream or downstream of the particulate filter, but rather, it is decided only on the basis of other criteria whether regeneration is to be stopped. In particular, the temperature upstream of the oxidizing catalytic converter, which corresponds to the exhaust gas temperature of the internal combustion engine, is taken into consideration. This quantity may be both measured, and advantageously determined from other operating variables, such as the load and the rotational speed.

One specific embodiment is especially advantageous in which the control system configured in such a way that the temperature is measured upstream of the particulate filter and compared to the setpoint value, and, starting from this comparison, the additional fuel quantity is determined.

Figure 3:
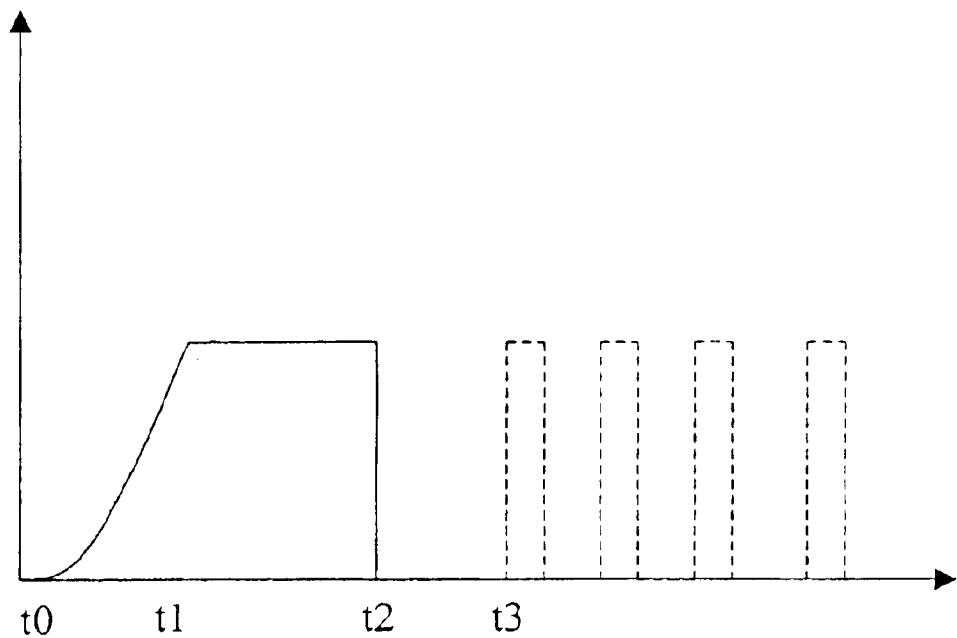
FIG. 3 is a graph that illustrates the variation with time of the additional amount of fuel.

In FIG. 3, the variation with time of the additional quantity QZ, which is metered in for the regeneration, is shown in exemplary form. In a first phase, between points in time t1 and t2, the additional quantity increases from zero to a constant value QKZ. Up to point t2, the constant quantity QKZ is metered in when the operating point is constant. When the operating point changes, the dosing quantity may be adjusted so that the exhaust gas temperature upstream of the particulate filter remains constant. At point t2, the retention time has expired, and the additional quantity is reduced to zero.

In one especially advantageous embodiment, which is shown by dotted lines, the additional quantity is briefly set to a constant value at point t3.

What is claimed is:

1. A method for controlling an exhaust gas aftertreatment system of an internal combustion engine, comprising:
   determining at least one first state variable characterizing a state of the exhaust gas aftertreatment system;
   initiating a special operating state for regenerating the exhaust gas aftertreatment system as a function of the state variable; and
   controlling a temperature of the exhaust gas aftertreatment system as a function of at least one of the state of the exhaust gas aftertreatment system and the state of the internal combustion engine by supplying uncombusted fuel to the exhaust gas, wherein, in a first phase, a quantity of uncombusted fuel in the exhaust gas increases over time, and, in a second phase, a quantity of uncombusted fuel in the exhaust gas takes on a constant value.

2. The method of claim 1, wherein a duration of at least one of the first phase and the second phase is specified.

3. The method of claim 1, further comprising:
   ending the second phase when regeneration of the exhaust gas aftertreatment system begins.

4. The method of claim 1, wherein, in a third phase, a quantity of uncombusted fuel is intermittently set to a constant value.

5. The method of claim 1, wherein the constant value is specified as a function of at least one of a rotational speed, a fuel quantity to be injected and a temperature upstream of the exhaust gas aftertreatment system.

6. The method of claim 1, further comprising:
   detecting a beginning of regeneration based on at least one of a temperature and an exhaust gas composition both upstream and downstream of the exhaust gas aftertreatment system.

7. A device for controlling an exhaust gas aftertreatment system of an internal combustion engine, comprising:
   a control unit for determining at least one state variable that characterizes a state of the exhaust gas aftertreatment system, and initiating a special operating state for regenerating the exhaust gas aftertreatment system as a function of the state variable;
   an arrangement for controlling a temperature of the exhaust gas aftertreatment system as a function of at least one of the state of the exhaust gas aftertreatment system and the state of the internal combustion engine; and
   an arrangement for supplying uncombusted fuel to the exhaust gas, wherein, in a first phase, a quantity of uncombusted fuel in the exhaust gas increases over time, and, in a second phase, a quantity of uncombusted fuel in the exhaust gas takes on a constant value.

* * * * *